(12) United States Patent  
Dawoud

(10) Patent No.: US 10,462,975 B2  
(45) Date of Patent: Nov. 5, 2019

(54) PORTABLE GRAIN SILO

(71) Applicant: Freddy Dawoud, Lawndale, CA (US)

(72) Inventor: Freddy Dawoud, Lawndale, CA (US)

( * ) Notice: Subject to any disclaimer, the term of this patent is extended or adjusted under 35 U.S.C. 154(b) by 0 days.

(21) Appl. No.: 15/708,114

(22) Filed: Sep. 18, 2017

(65) Prior Publication Data

US 2018/0295782 A1 Oct. 18, 2018

Related U.S. Application Data

(60) Provisional application No. 62/396,663, filed on Sep. 19, 2016.

(51) Int. Cl.
| | | |
|---|---|---|
| *A01F 25/14* | (2006.01) | |
| *A01C 15/00* | (2006.01) | |
| *E04H 7/24* | (2006.01) | |
| *B65G 65/46* | (2006.01) | |

(52) U.S. Cl.  
CPC ............ *A01F 25/14* (2013.01); *A01C 15/003* (2013.01); *E04H 7/24* (2013.01); *B65G 65/466* (2013.01); *Y10S 52/09* (2013.01)

(58) Field of Classification Search  
CPC .. E04H 7/22; E04H 7/24; E04H 15/26; E04H 15/28; A01C 15/003; A01F 25/163; A01F 25/183; A01F 25/2018; B65D 88/546; B65G 65/30; B65G 65/32; B65G 65/34; B65G 65/40; B65G 65/46; B65G 65/463; Y02A 40/55; Y10S 52/09; Y10S 135/902  
See application file for complete search history.

(56) References Cited

U.S. PATENT DOCUMENTS

| | | | | |
|---|---|---|---|---|
| 395,245 | A * | 12/1888 | Mann ...................... | E04H 15/28 135/98 |
| 1,409,316 | A * | 3/1922 | Smith .................... | E04H 15/003 135/100 |
| 1,649,219 | A * | 11/1927 | Goldberg ................ | E04H 15/28 135/120.3 |
| 2,728,470 | A * | 12/1955 | Peterson ................ | B65G 65/46 414/326 |
| 2,865,387 | A * | 12/1958 | Annibaldi ............... | E04H 15/28 135/139 |
| 3,213,868 | A * | 10/1965 | Forbes ................... | E04H 15/28 135/116 |
| 3,333,595 | A * | 8/1967 | Bannister ............... | E04H 15/28 135/116 |
| 3,419,024 | A * | 12/1968 | Nickerson, Jr. ........ | E04H 1/1244 135/120.1 |
| 3,520,092 | A * | 7/1970 | Petrik ..................... | E04B 1/3211 264/32 |

(Continued)

FOREIGN PATENT DOCUMENTS

| | | | | |
|---|---|---|---|---|
| CA | 2953202 | A1 * | 12/2015 | ............... E04C 2/40 |
| DE | 1088875 | B * | 9/1960 | ............. A01F 25/04 |

(Continued)

*Primary Examiner* — James Keenan  
(74) *Attorney, Agent, or Firm* — Larisa Migachyov

(57) ABSTRACT

A flexible portable silo for storing grains and bulk materials, comprising a flexible cylindrical wall and a flexible conical roof made of a flexible, foldable, tension bearing sheet membrane, and a single pressure bearing post, with outriggers installed at the top of the post. The flexible cylindrical wall and conical roof are then draped over the outriggers and post and filled with grain or other bulk material.

9 Claims, 8 Drawing Sheets

(56) References Cited

U.S. PATENT DOCUMENTS

| 7,186,449 | B1 * | 3/2007 | Hansen | B32B 1/08 |
| | | | | 156/184 |
| 2003/0054135 | A1 * | 3/2003 | Roberts | B29C 39/021 |
| | | | | 428/172 |
| 2009/0044461 | A1 * | 2/2009 | Diamond | E04B 1/12 |
| | | | | 52/79.9 |

FOREIGN PATENT DOCUMENTS

| EP | 0277667 A1 * | 8/1988 | A01C 15/003 |
| EP | 0315403 A1 * | 5/1989 | B65G 65/463 |
| WO | WO-2008003819 A1 * | 1/2008 | B26D 1/20 |

* cited by examiner

5

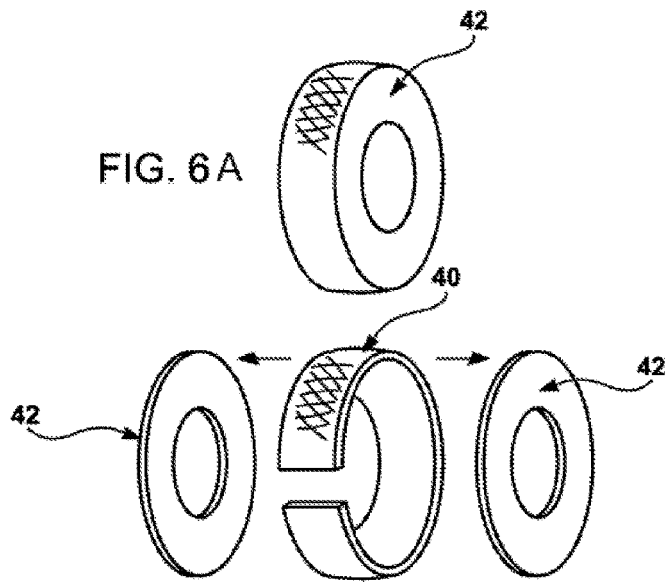
FIG. 6A
FIG. 6B
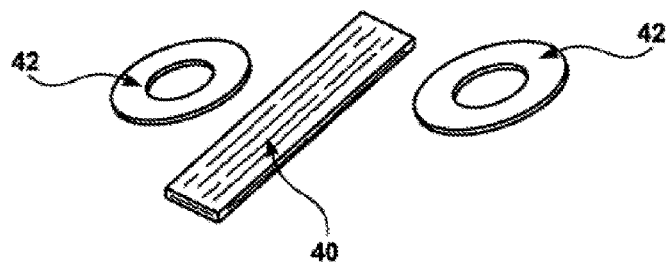
FIG. 6C

PORTABLE GRAIN SILO

CROSS-REFERENCE TO RELATED APPLICATIONS

The present application takes priority from Provisional App. No. 62/396,663, filed Sep. 19, 2016, which is incorporated herein by reference.

BACKGROUND

Vertical grain silos are typically manufactured from reinforced concrete or sheet metal. These materials make the grain silo very heavy, difficult to construct, and impossible to move. Furthermore, the lifetime of the silo is limited by the corrosion of the sheetmetal, which usually does not last longer than 30 years.

While some prior art options exist for flexible-walled grain silos, these are typically not vertical storage. For example, U.S. Pat. No. 3,727,656 to Luders uses a tarp to cover grain that is stored in a hole in the ground. Since ground pressure is used to contain the grain, it takes up more horizontal area than vertical storage. Similarly, U.S. Pat. No. 4,660,336 to Ross uses the ground to contain grain at a shallow depth. This, too, uses a lot of land area.

A need exists for a cheap and lightweight vertical grain silo that is easy to erect and does not use a lot of land.

LIST OF FIGURES

Figure 3A:
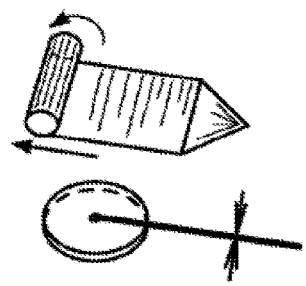
Figure 3B:
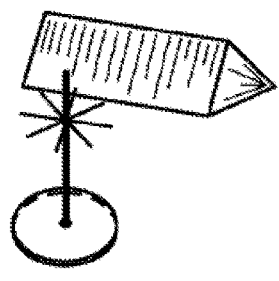
Figure 3C:
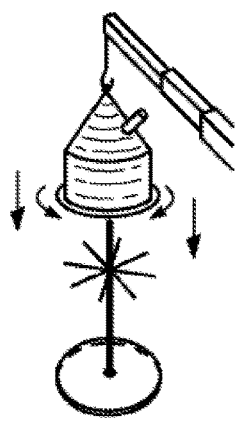
Figure 3D:
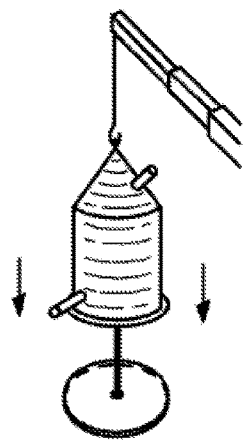
Figure 3E:
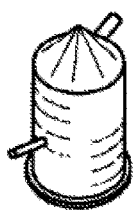

FIG. 3A shows the installation method for the grain silo of the present invention FIG. 3B shows the installation method for the grain silo of the present invention. FIG. 3C shows the installation method for the grain silo of the present invention. FIG. 3D shows the installation method for the grain silo of the present invention. FIG. 3E shows the installation method for the grain silo of the present invention.

Figure 4A:
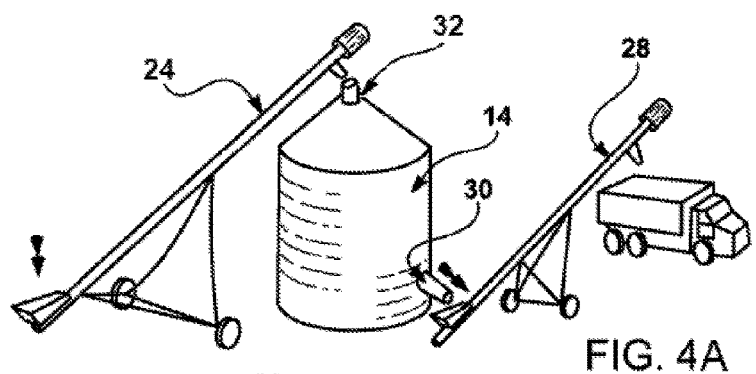
Figure 4B:
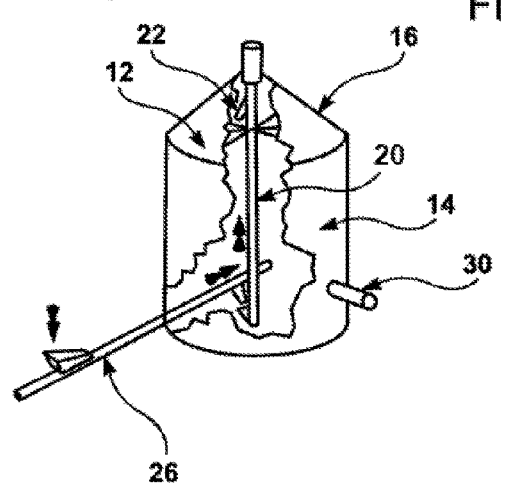

FIG. 4A shows the filling method for the grain silo of the present invention. FIG. 4B shows the filling method for the grain silo of the present invention.

Figure 5A:
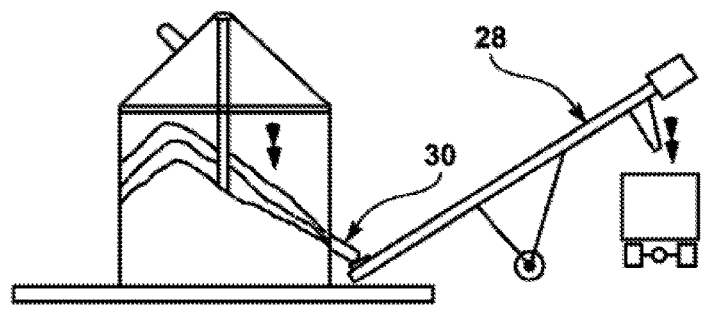
Figure 5B:
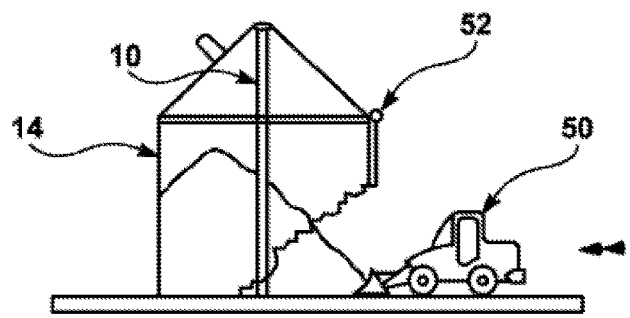

FIG. 5A shows the emptying method for the grain silo of the present invention. FIG. 5B shows the emptying method for the grain silo of the present invention.

FIG. 6A shows a method for processing used tires to form the membrane for an embodiment of the grain silo of the present invention. FIG. 6B shows a method for processing used tires to form the membrane for an embodiment of the grain silo of the present invention. FIG. 6C shows a method for processing used tires to form the membrane for an embodiment of the grain silo of the present invention.

Figure 7:
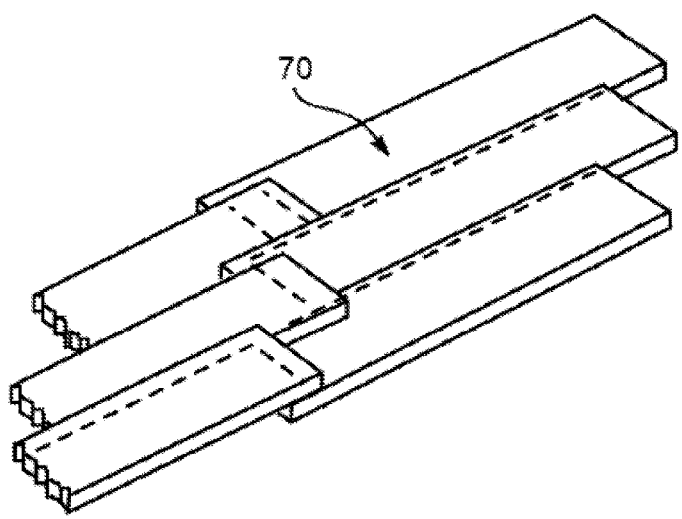

FIG. 7 shows a method for processing used tires to form the membrane for an embodiment of the grain silo of the present invention.

Figure 8:
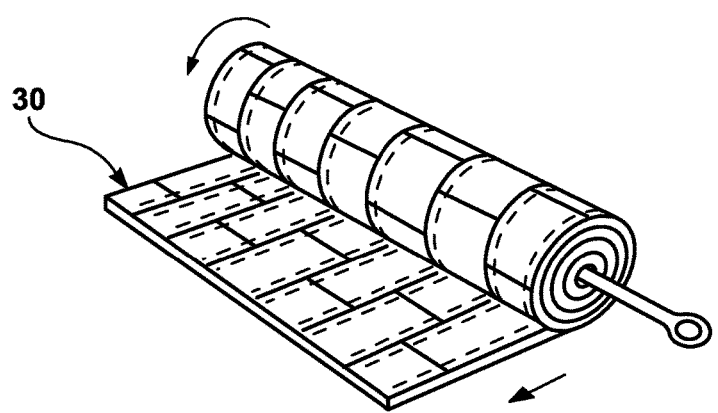

FIG. 8 shows a membrane made by the method shown in FIG. 7.

SUMMARY OF THE INVENTION

An object of the present invention is to provide a grain silo that uses flexible material for its walls.

Another object of the present invention is to provide a grain silo that is cheap and lightweight.

Another object of the present invention is to provide a grain silo that is easy to erect and to disassemble.

Another object of the present invention is to provide a grain silo that does not use a lot of land area.

The silo of the present invention comprises a vertical post, where the bottom end of the vertical post is attached to a base that is rigidly attached to the ground. There are at least three linear outriggers mounted at a first distance from the top end of the vertical post, perpendicular to the vertical post, all the outriggers being approximately the same length. A flexible cylindrical wall is attached to a flexible conical roof, and the assembly of the flexible cylindrical wall and flexible conical roof is draped over the assembly of the vertical post, outriggers, and base. The height of the flexible conical roof is approximately equal to the first distance, and the radius of the flexible conical roof is approximately equal to the length of an outrigger. The height of the flexible cylindrical wall is approximately the same as the distance between the linear outriggers and the base, so that the bottom opening of the flexible cylindrical wall rests on the base. The tip of the flexible conical roof rests on the top end of the vertical post and the lower opening of the flexible conical roof rests on the ends of the outriggers. The flexible conical roof comprises an opening for filling the silo with grain, and the flexible cylindrical wall comprises an opening for emptying the silo.

The flexible cylindrical wall and flexible conical roof are preferably made out of a tension-resistant material. In an embodiment, they are made of recycled rubber originating from used automotive tires, overlapped and fused together so as to form a continuous sheet of material.

In an embodiment, the vertical post and outriggers are preferably made of wood, steel, or concrete piping.

In an embodiment, the silo further comprises a lift winch mounted at or near the top of the flexible cylindrical wall. The lift winch is used to partially lift the bottom edge of the flexible cylindrical wall.

In an embodiment, the length of the flexible cylindrical wall is at least 3 times the diameter.

The method of assembling the silo of the present invention preferably comprises creating a base, where the base comprises concrete cast in the ground and at least one bolt in the middle of the base; attaching at least three outriggers to a vertical post in a torque-resistant way, wherein the outriggers are attached perpendicular to the vertical post at a first distance from the top end of the vertical post; mounting the bottom end of the vertical post to the base using at least one bolt in such a way that the vertical post is perpendicular to the base and to the ground; attaching a flexible conical roof to the top end of a flexible cylindrical wall, wherein the height of the flexible conical roof is approximately equal to the first distance; raising the assembly of the flexible conical roof and the flexible cylindrical wall over the assembly of the vertical post and outriggers, and draping the flexible cylindrical wall and the flexible conical roof over the at least three outriggers in such a way that the top of the flexible conical roof rests on the top end of the vertical post, the top edge of the flexible cylindrical wall touches the ends of the outriggers, and the bottom edge of the flexible cylindrical wall touches the base.

In an embodiment, the outriggers are attached to the vertical post by welding or bolting.

In an embodiment, the silo is filled through an opening in the flexible conical roof.

In an embodiment, the silo is emptied through an opening near the bottom end of the flexible cylindrical wall.

In an embodiment, the silo is emptied by lifting the bottom edge of the flexible cylindrical wall off the base and removing the grain from the silo.

DETAILED DESCRIPTION OF THE PREFERRED EMBODIMENT

It will be understood that the below description of the preferred embodiment of the present invention is intended solely as an illustration, and not meant to be limiting.

Furthermore, in the preferred embodiment, the silo of the present invention is used to store grain; however, any free flowing bulk materials may also be stored. The fact that grain is used for the examples below is not meant to be limiting the silo to exclusively grain storage.

Figure 1:
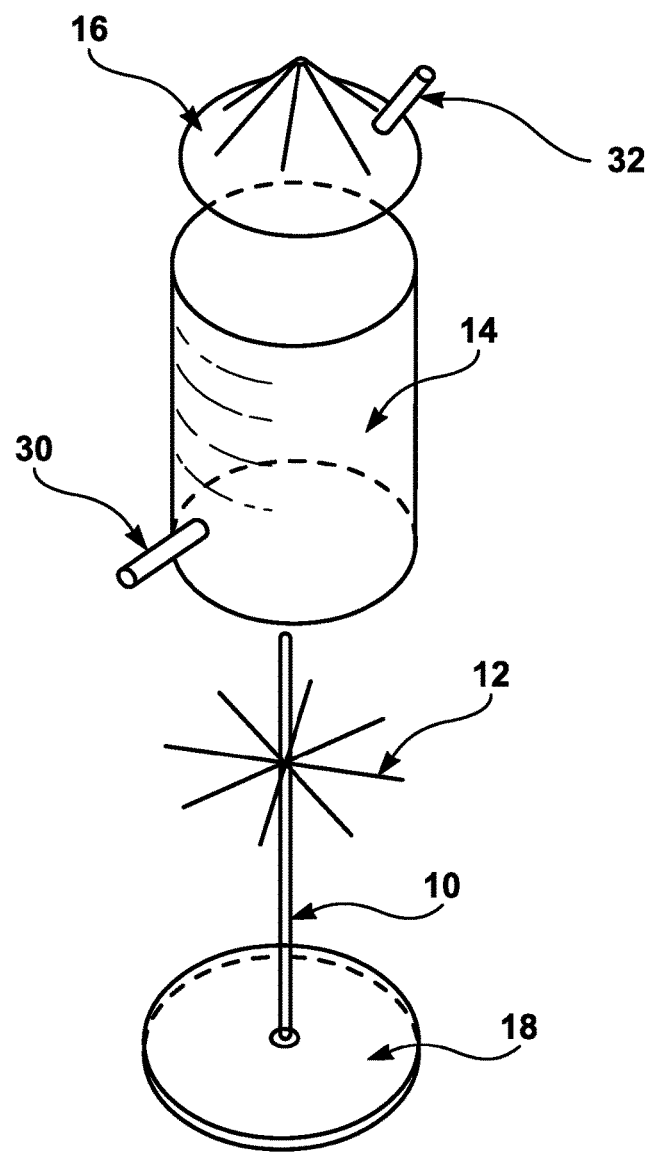
FIG. 1 shows an exploded view of the grain silo of the present invention.

FIG. 1 shows the preferred embodiment of the present invention as an exploded view, with no grain in the silo. A vertical post 10 is mounted on a base 18. Six outriggers 12 are attached to the vertical post 10 as shown in the Figure. A flexible cylindrical wall 14 and flexible conical roof 16 are then draped over the assembly of the vertical post and outriggers. The dimensions of the flexible cylindrical wall and flexible conical roof are such that the bottom edge of the flexible conical roof (which is hermetically attached to the top edge of the flexible cylindrical wall) rest on the outriggers, and the bottom edge of the flexible cylindrical wall rests on the base. The silo is then filled with grain through the roof opening 32. It can be emptied out through the bottom opening 30.

This design enables the present invention to be lightweight, since the vertical post only needs to support the weight of the empty flexible cylindrical wall, and the flexible cylindrical wall only needs to resist tension resulted from internal material pressure, and its own light weight only. Once the silo is filled with grain, the vertical post bears very little weight, and the outriggers bear no weight at all (the weight of the grain pushes forms internal pressure that acts outwards only on the flexible cylindrical wall and flexible conical roof).

Also, this design is highly portable. The flexible cylindrical wall and flexible conical roof may be folded or rolled up in the factory and thus easily transported on common trucks. The outriggers and vertical post may be detached from each other for transport, making for a compact package.

Figure 2A:
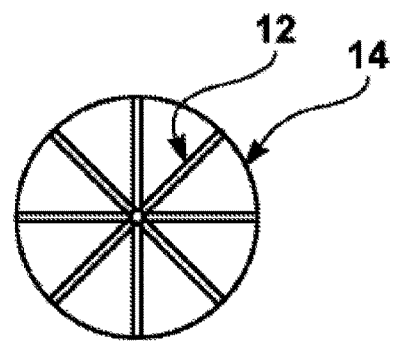
FIG. 2A shows a top and side view of the grain silo of the present invention.
Figure 2B:
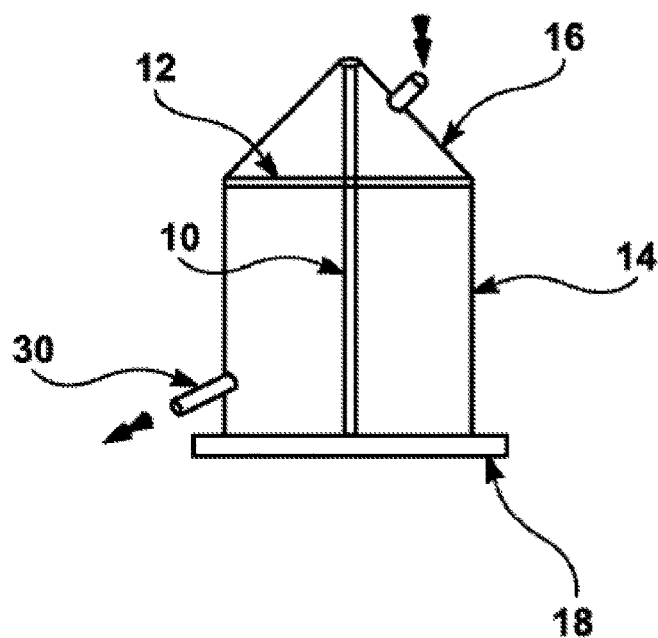
FIG. 2B shows a top and side view of the grain silo of the present invention.

FIG. 2A shows the top view and FIG. 2B shows the side cross-sectional view of the present invention when fully assembled. As shown in the Figures, the silo of the present invention may or may not be closed at the bottom. There is no necessity for doing so; the stored material's internal friction prevents the material from slipping below the edge of the cylindrical walls of the flexible cylinder to the outside. Furthermore, the fact that the silo is not closed at the bottom makes it easier to empty the silo by simply lifting up the bottom edge of the flexible cylindrical wall (as will be discussed below).

As can be seen in FIGS. 2A and 2B, the conical roof 16 is attached to the flexible cylindrical wall 14, preferably in a hermetically sealed way, to prevent rain water leakage. The tip of the conical roof 16 rests on top of the vertical post 10, and the top edge of the flexible cylindrical wall 14 (together with the bottom edge of the conical roof 16) is supported by the outriggers 12. The outriggers 12 are not attached to either the flexible cylindrical wall 14 or the flexible conical roof 16; they are simply there to keep the assembly of the flexible cylindrical wall and the flexible conical roof in a stretched round cylindrical shape until it is filled with grain (which then will provide structural support by itself).

As shown in FIGS. 4A and 4B, the silo is filled by means of roof opening 32. The roof opening 32 preferably comprises a tube (as shown in the Figures) to connect to the device that does the filling and to prevent leakage of grain. The filling can be done by any standard method of filling grain silos known in the art. In the preferred embodiment, a mobile conveyor 24 is used to fill the silo with grain. In an alternate embodiment, a vertical screw conveyor 20 can be used to raise the material to the top of the silo; a horizontal conveyor 26 is used to transport the material from outside the silo to the feeding point of the vertical screw conveyor 20. It will be understood that any other method of filling grain silos is also consonant with the present invention.

As shown in FIG. 5A, the grain silo can be evacuated by means of evacuation gate 30. The evacuation gate 30 is preferably located near the bottom edge of the flexible cylindrical wall, and is basically a cylindrical pipe with a hinged hatch that may be opened or closed, by bolting or by pressurized air piston. In the preferred embodiment, it is held closed during normal use, and then opened when grain needs to be emptied out of the silo. In the preferred embodiment, the grain is moved by gravity to an inclined mobile conveyor 28 outside, which transports the grain to be loaded on trucks or trains.

After the material is unloaded to a certain height, as shown in FIG. 5B, the outwards pressure on the side walls is reduced and it is now possible to lift the bottom edge of the flexible cylindrical wall in order to evacuate the remaining grain. The lifting may be done manually, or with the help of a front end wheel loader arm, but is preferably done by means of a hoist 52 mounted at or near the top edge of the flexible cylindrical wall, with a wire rope extending downward to engage with the bottom edge of the flexible cylindrical wall by means of a hook or some other attachment means. Multiple hoists may also be used if desired. Once the bottom edge of the flexible cylindrical wall is partially lifted (as shown in the Figure), a front wheel loader 50 can then enter below the skirt walls and scoop the remainder of the material to evacuate it out of the silo.

FIG. 3 shows an embodiment of the method used to erect the silo of the present invention. The flexible cylindrical wall and flexible conical roof (connected together) are stored rolled up. The vertical post and the outriggers are stored separately.

First, the flexible cylinder and conical roof are unrolled on the ground, as shown in Step 1. A concrete base is cast at the desired location; the base comprises at least one bolt to anchor the vertical post. The outriggers are attached to the vertical post at a particular distance from the top end of the vertical post, where that distance is approximately equal to the height of the flexible conical roof. The outriggers are perpendicular to the vertical post and installed by welding, bolting, or any other torque-resistant means of installation. In the preferred embodiment, the outriggers are bolted or welded onto the vertical post to simplify installation. As can be seen from FIG. 3, the angles between each pair of neighboring outriggers are approximately equal, though this is not required by the present invention. The only requirement is that the outriggers be installed in such a way as to keep the cross section of the flexible conical roof and flexible cylindrical wall stretched as a circle thus can be easily filled with the bulk material.

The vertical post and horizontal outriggers are then installed on the foundation, as shown in Step 2. This is preferably done by raising the vertical post and outrigger assembly into position and bolting it in place on the concrete base. Then, as shown in Step 3, the assembly of the flexible cylindrical wall and the flexible conical roof is raised above the vertical post, preferably by means of a crane; the flexible cylindrical wall is gathered up, as shown in the Figure, to enable the entire assembly to be raised above the vertical post. When being dropped down, the lower edges of the flexible cylindrical wall may be kept open by attaching a line rope to said edges and pulling it outwards by people on the ground. Then, as shown in Step 4, the assembly is draped over the vertical post and horizontal outriggers, and released until the bottom of the flexible cylinder touches the foundation, as shown in Step 5. In another scenario for assembly, the vertical post and the outriggers are put inside the flexible walls, the outriggers are bolted to the post while inside the flexible walls, and then the whole assemble is tilted or raised up, and the vertical post is bolted to the concrete base. The silo is then ready to be filled with grain or other material.

One of the advantages of the present invention is that the weight of the stored material rests on the ground rather than on any part of the silo; this means that the flexible cylinder walls only bear the outward pressure of the stored material rather than its weight. The internal friction of the stored material provides the main structural support.

In the preferred embodiment, the vertical post comprises a vertical screw conveyor 20. An additional horizontal conveyor 26 is installed at the ground level to transport the material to the feeding point of the vertical screw conveyor, which raises the material to the highest point of the silo and discharges it into the silo through a chute.

The material used for the flexible cylinder and conical roof is preferably flexible, lightweight, tension resistant, and water and fire resistant. In the preferred embodiment, it is polypropylene, plied rubber, or other high-strength flexible materials may also be used.

In an embodiment shown in FIGS. 6A-6C, recycled rubber tires are used to manufacture the silo. The outer ring of a discarded rubber tire is extremely tough and highly tension-resistant even after the outer rubber treads are partially worn out. This material is also highly abundant, and cheap. In this embodiment, used tires are initially selected visually to eliminate any tires with visible damage. Then, the outer ring 40 of each tire is cut and separated from the side walls 42. Several outer rings are bolted together to form a long belt. Several belts are joined laterally using either conveyor belt joining bolts or wire sewing. This results in a large continuous sheet of rubber 70, as shown in FIG. 7, which can be used to manufacture the flexible cylinder and conical roof of the silo. FIG. 8 shows a roll of the continuous sheet of rubber.

While the silo can be of any dimensions, the preferred dimensions for this invention are a height of 15-20 m and a diameter of 6-8 m. It is possible for the silo to be larger if thicker/stronger membranes are used.

An exemplary embodiment is described above; it will be understood that the invention encompasses other embodiments that form reasonable equivalents to the elements of the present invention.

The invention claimed is:

1. A bulk storage silo for storing grain, comprising:
   a vertical post comprising a bottom end and a top end;
   a base, wherein the base is rigidly attached to the ground, wherein the bottom end of the vertical post is rigidly attached to the base;
   at least three linear outriggers mounted at a first distance from the top end of the vertical post, such that the outriggers are perpendicular to the vertical post,
   wherein all the outriggers are approximately the same length, each outrigger comprising a free end;
   a flexible cylindrical wall comprising a bottom opening and a top opening, wherein a radius of the top opening is approximately the same as the horizontal distance from the vertical post to the free end of an outrigger;
   a flexible conical roof attached to the top opening of the flexible cylindrical wall, wherein the height of the conical roof is approximately equal to the first distance, wherein the radius of the conical roof is approximately equal to the radius of the flexible cylindrical wall;
   wherein the vertex of the flexible conical roof rests on the top end of the vertical post;
   wherein the top opening of the flexible cylindrical wall is draped over the free ends of the at least three outriggers;
   wherein the bottom opening of the flexible cylindrical wall rests on the base;
   wherein the flexible conical roof comprises an opening for filling the bulk storage silo with bulk items;
   wherein the flexible cylindrical wall comprises an opening for emptying bulk items out of the bulk storage silo.

2. The bulk storage silo of claim 1, wherein the flexible cylindrical wall and the flexible conical roof are made of a tension-resistant material.

3. The bulk storage silo of claim 1, wherein the flexible cylindrical wall and the flexible conical roof are made of recycled plied rubber treads originating from used tires.

4. The bulk storage silo of claim 1, wherein the vertical post comprises a wood, steel, or concrete pipe.

5. The bulk storage silo of claim 1, wherein the outriggers each comprise a wood, steel, or concrete pipe.

6. The bulk storage silo of claim 1, further comprising:
   a lift winch mounted on the free end of an outrigger;
   an attachment means located on the bottom opening of the flexible cylindrical wall, said attachment means capable of engaging with the lift winch in such a way that the bottom opening of the flexible cylindrical wall may be partially lifted.

7. The bulk storage silo of claim 6, wherein the lift winch may be used for loading bulk material into the bulk storage silo.

8. The bulk storage silo of claim 1, wherein the vertical post is hollow, further comprising:
   a screw conveyor installed inside the vertical post;
   a first opening near the bottom end of the vertical post for entry of bulk material into the screw conveyor;
   a second opening near the top end of the vertical post for the exit of bulk material from the screw conveyor and into the silo;
   a horizontal conveyor installed in such a way that an entry point of the horizontal conveyor is located at the bottom opening of the flexible cylindrical wall and an exit point of the horizontal conveyor is located at the first opening.

9. The bulk storage silo of claim 1, wherein the flexible cylindrical wall and flexible conical roof consist of rubber strips cut from recycled automotive tire treads, wherein the rubber strips are overlapped and joined together in such a way as to form a continuous sheet of material.

* * * * *